United States Patent [19]

Etienne et al.

[11] Patent Number: 5,234,590
[45] Date of Patent: Aug. 10, 1993

[54] HIGH STRENGTH AND LIGHT TUBESHEETS FOR HOLLOW FIBER MEMBRANE PERMEATORS

[75] Inventors: Billy J. Etienne; Gene W. Lou, both of Newark, Del.; Kenneth R. Heath, Port Deposit, Md.

[73] Assignees: E. I. Du Pont de Nemours and Company, Wilmington, Del.; L'Air Liquide S.A., Paris Cedex, France

[21] Appl. No.: 857,176

[22] Filed: Mar. 25, 1992

[51] Int. Cl.$^5$ .............................................. B01D 63/02
[52] U.S. Cl. ............................ 210/321.61; 210/500.23
[58] Field of Search ....................... 210/500.23, 321.61, 210/321.8, 321.84; 55/16, 158

[56] References Cited

U.S. PATENT DOCUMENTS

| | | | |
|---|---|---|---|
| 3,150,032 | 9/1964 | Rubenstein | 161/161 |
| 3,918,218 | 11/1975 | Zoiss | 51/298 |
| 3,959,174 | 5/1976 | Winyall et al. | 252/317 |
| 4,035,545 | 7/1977 | Ivanov et al. | 428/328 |
| 4,086,098 | 4/1978 | Le Ruyet et al. | 106/97 |
| 4,115,077 | 9/1978 | Fukuda | 51/296 |
| 4,217,264 | 8/1980 | Mabie et al. | 260/42.15 |
| 4,234,330 | 11/1980 | Taupin et al. | 65/21 |
| 4,255,482 | 3/1981 | Udagawa | 428/215 |
| 4,306,913 | 12/1981 | Mabie et al. | 106/288 B |
| 4,323,453 | 4/1982 | Zampini | 210/321.61 |
| 4,323,454 | 4/1982 | Fritzsche et al. | 210/321.1 |
| 4,323,623 | 4/1982 | Ahrens et al. | 428/246 |
| 4,401,715 | 8/1983 | Nomura et al. | 428/306.6 |
| 4,405,543 | 9/1983 | Murphy et al. | 264/123 |
| 4,492,732 | 1/1985 | Murphy et al. | 428/404 |
| 4,522,878 | 6/1985 | Martin et al. | 428/313.7 |
| 4,595,623 | 6/1986 | Du Pont et al. | 428/195 |
| 4,657,810 | 4/1987 | Douden | 428/313.9 |
| 4,667,650 | 5/1987 | Girard et al. | 125/13 R |
| 4,677,022 | 6/1987 | Dejaiffe | 428/312.6 |
| 4,707,504 | 11/1987 | Walkowiak et al. | 523/109 |
| 4,737,407 | 4/1988 | Wycech | 428/323 |

*Primary Examiner*—Frank Spear

[57] ABSTRACT

A high strength and low weight hollow fiber membrane tubesheet can be achieved by incorporating with the potting material a loading of a nominally spherical filler. The microsphere filler is preferably nonsmooth, hollow and nonporous and may be treated with a surface modifier agent. Other advantages are also obtained including improved machineability with more open, nonsmeared and nondistorted hollow fibers.

8 Claims, 4 Drawing Sheets

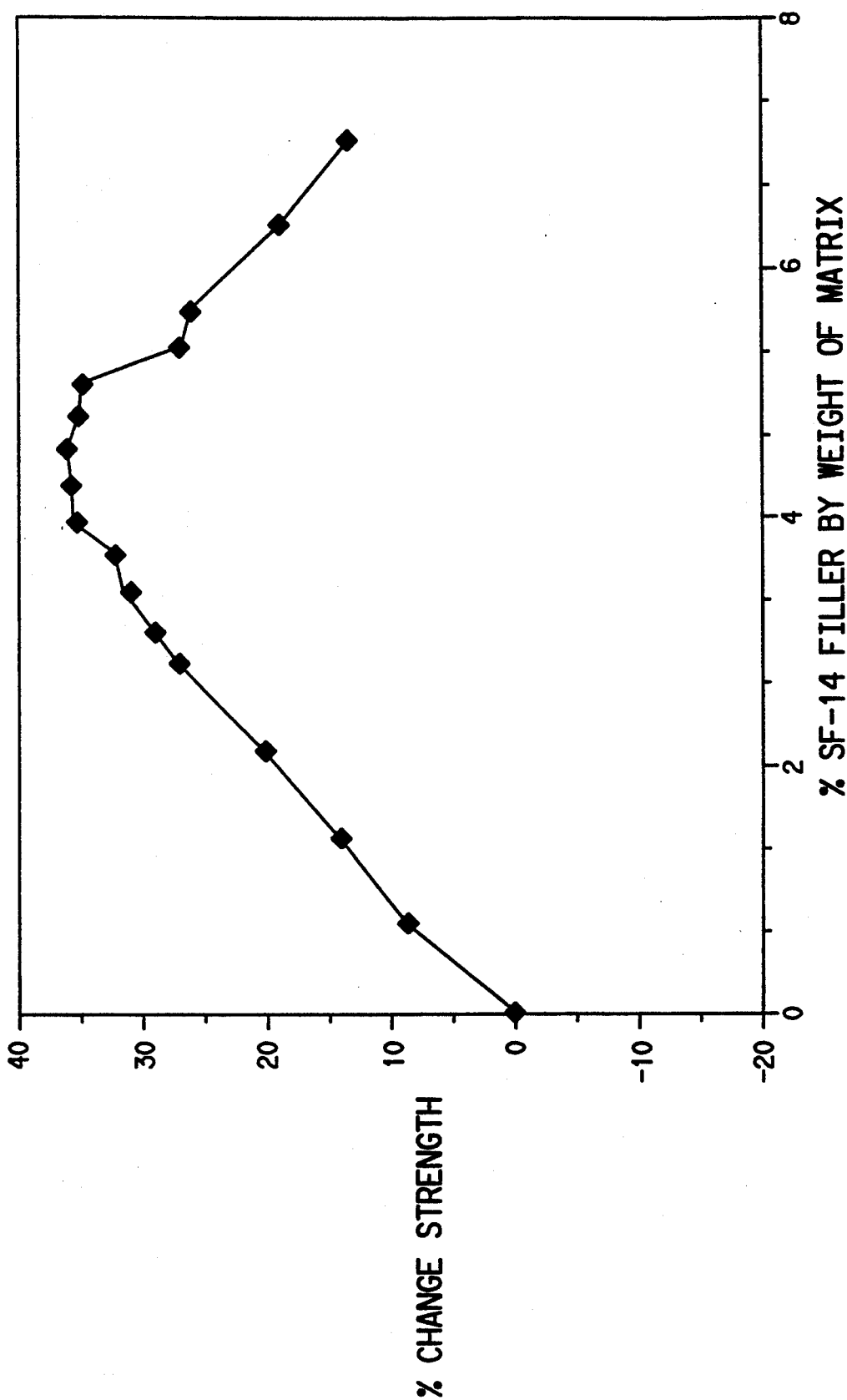

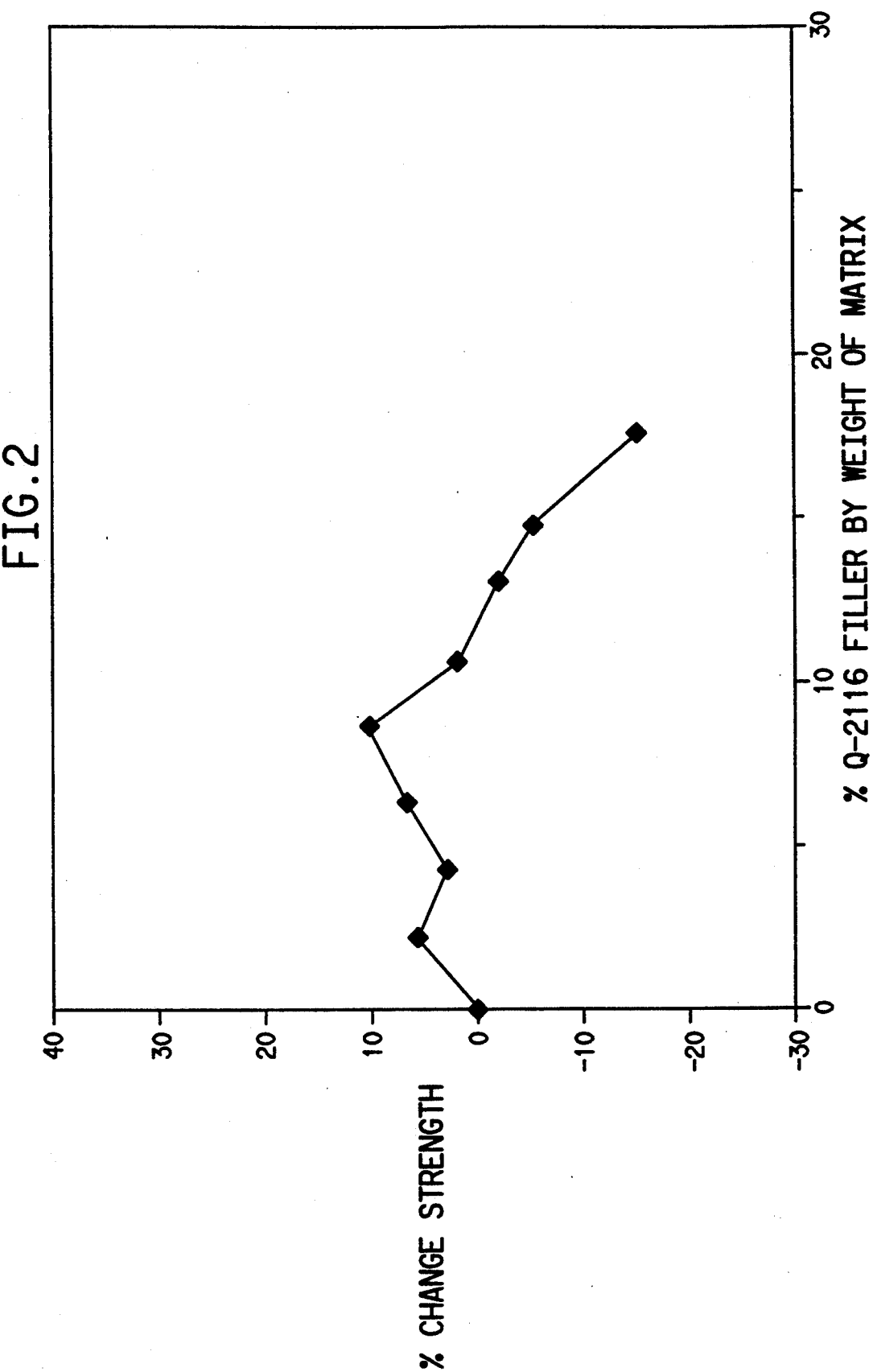

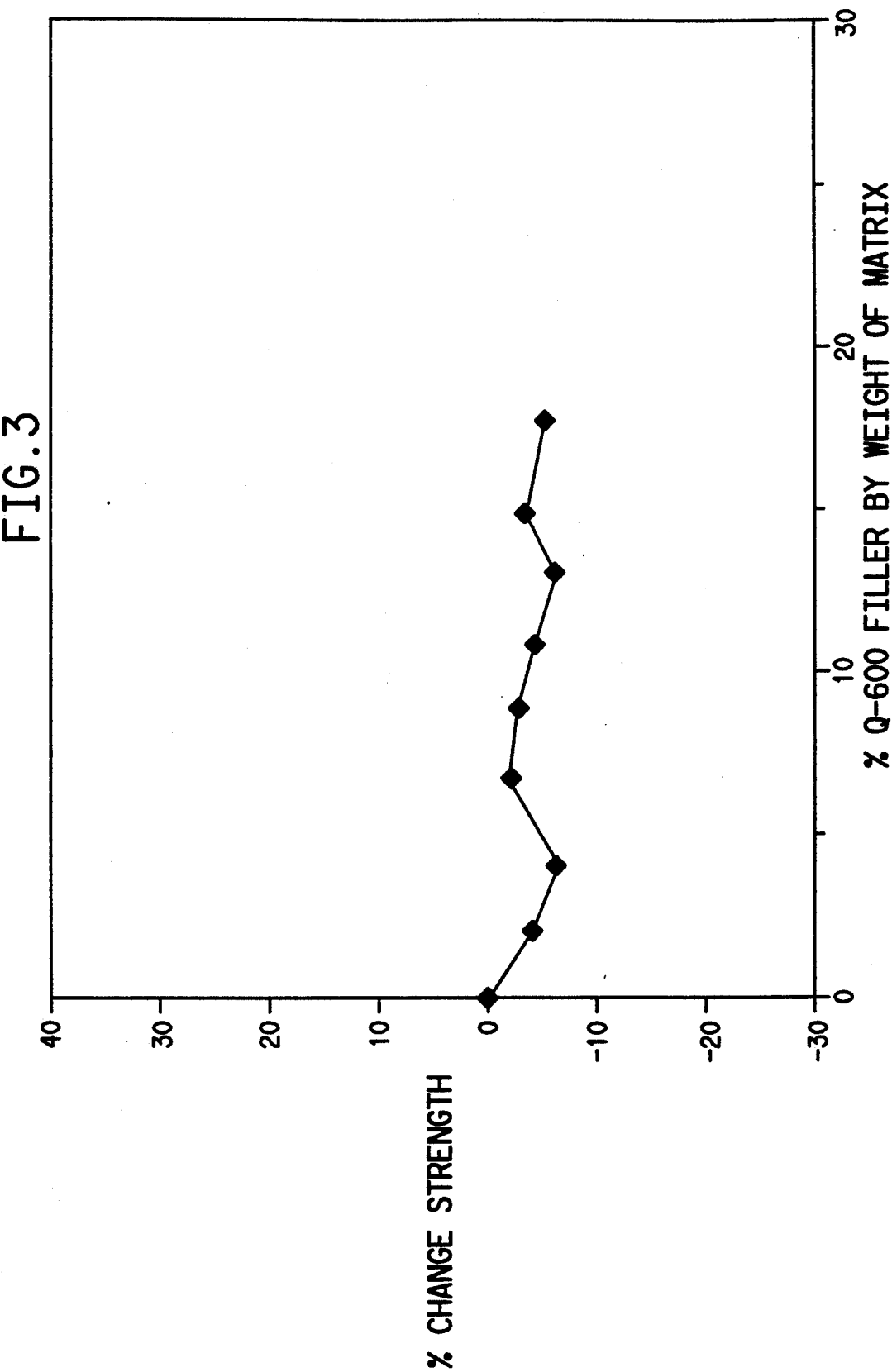

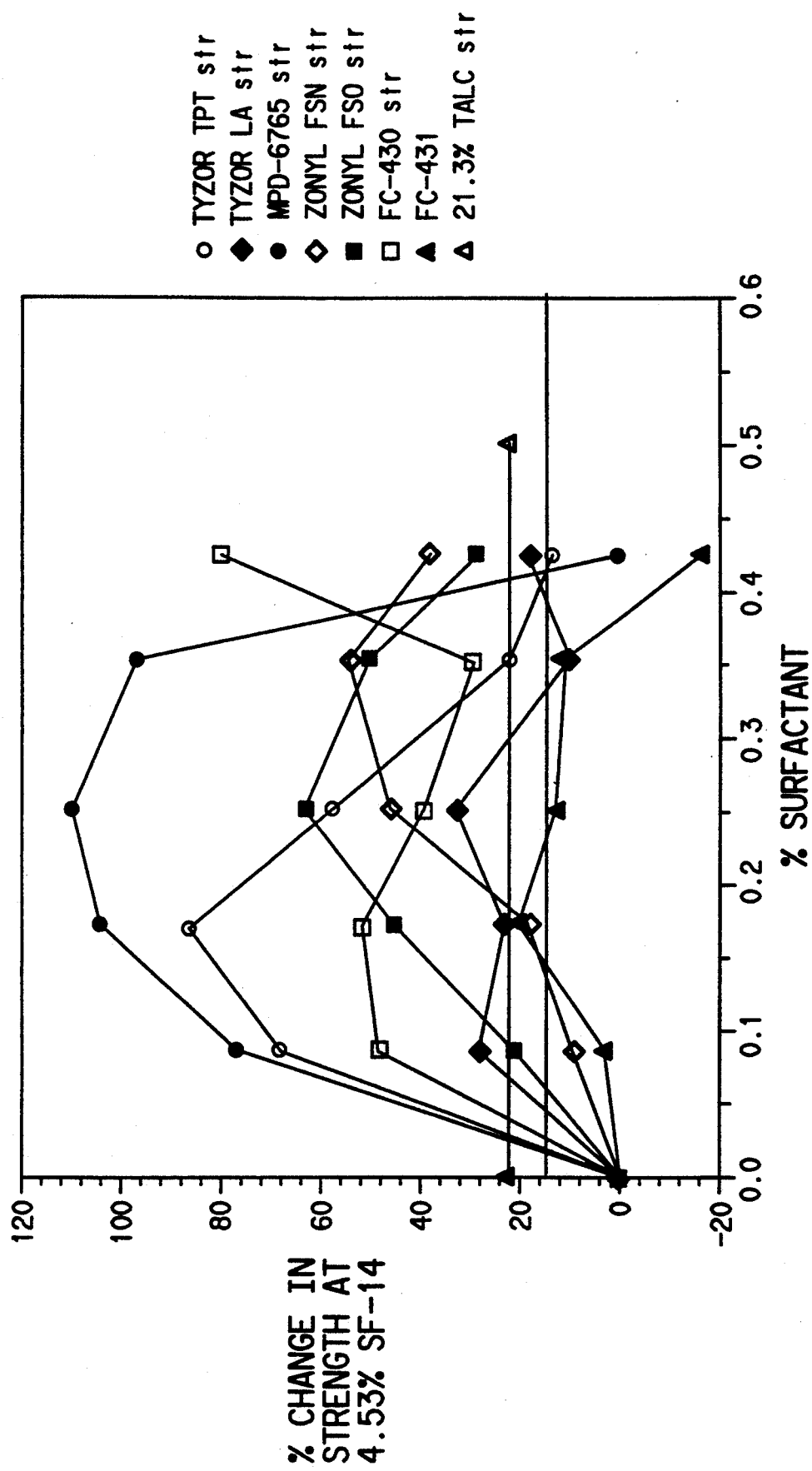

HIGH STRENGTH AND LIGHT TUBESHEETS FOR HOLLOW FIBER MEMBRANE PERMEATORS

DESCRIPTION OF THE INVENTION

The invention pertains to permeators having a plurality of hollow fiber membranes in which at least one end portion of a bundle of the hollow fiber membranes is embedded in and extends through a tubesheet. In particular, the invention pertains to a permeator with an epoxy matrix which incorporates a microsphere filler to form a tubesheet with high strength, low weight and high ease of machinability.

BACKGROUND OF THE INVENTION

Permeators containing hollow fiber membranes are characterized by having at least one end of each of the hollow fiber membranes embedded in a solid material in a fluid tight manner to form a tubesheet. This tubesheet is typically composed of crosslinkable epoxy resins which provide support for the hollow fibers in the permeator, mechanical integrity to withstand operating pressure and temperature conditions, chemical resistance, and imparts a tight seal to prevent fluid communication between the exterior side and the bore side of each of the hollow fiber membranes except through the walls of the hollow fiber membranes. There is a problem that tubesheets in hollow fiber permeators add significantly to the weight of the permeator assembly. Such weight is especially a concern in applications on board helicopters and aircraft, especially combat aircraft, where low weight is critical to high-performance operation. It is also necessary that the tubesheet be strong enough to withstand large shear stresses encountered when fluid pressure is applied to the tubesheet during operation of the permeator. The tubesheet and the hollow fiber membranes must also be easily machinable in order to facilitate the construction of the permeator.

It is known to put fillers in resins to reduce weight and increase strength, although these two properties do not commonly occur with the same filler. There is a problem when putting low weight fillers in the tubesheet because the fillers must mix thoroughly with the tubesheet resin, flow completely around the hollow fibers so as not to create voids in the tubesheet matrix which would decrease shear strength and create leak paths for the fluid through the tubesheet. The fillers must also maintain their integrity under the high temperatures often encountered in curing the commonly used polymerizable resins in tubesheets. U.S. Pat. No. 4,323,454 assigned to Monsanto Company describes a tubesheet which may incorporate a broad range of microsphere fillers for the primary purpose of reducing the peak curing temperature to fabricate the tubesheet. In particular, the tubesheet described in this patent has a resin containing a major amount by weight of polyglycidyl resin having a viscosity of about 1,000 to 30,000 centipoises at 25° C.; curing agent composition in an amount sufficient to consume at least about 90 percent of the glycidyl groups in the liquid resinous composition; and particulate filler having a density of about 1 to 10 grams per cubic centimeter at 25° C., an average maximum particle size of about 1.5 to 150 microns, and a surface area of less than about 5 square meters per gram of filler, said filler comprising about 5 to less than about 35 percent by volume of the liquid resinous composition. This reference discloses the use of fillers only for tubesheets made from a polyglycidyl resin, which resin has a viscosity of about 500 to 12,000 centipoises. It does not contemplate tubesheets having a resin with a higher viscosity, which resins are utilized in state-of-the-art tubesheets. Also, one of the shortcomings of the tubesheet in U.S. Pat. No. 4,323,454 is that it does not consider improvements to the machinability of the tubesheet while providing a lightweight, high strength tubesheet which maintains the desirable properties of the prior art. Machinability of the hollow fiber membranes is especially important in view of state-of-the-art hollow fiber membranes which are fragile and easily damaged during machining and skiving operations.

The prior art also discloses the use of microporous inorganic fillers in polymerizable compositions for dental applications which are smooth and easy to polish. The prior art also describes the production and use of thermoset plastic pellets containing expandable hollow microspheres. It is also known to use talc as an inorganic filler in tubesheets for hollow-fiber membrane permeators; however, the addition of talc can adversely effect the strength of the tubesheet.

The operating efficiency of a permeator depends partly on the ability of fluids to flow at the exterior and bore sides of the membranes. If fluid flow is restricted, a reduction in product recovery and/or purity may result. Therefore, it is highly desirable that the bores of the hollow fiber membrane be completely open for fluid communication through the tubesheet. The openings of the fiber bores can be easily obstructed during the preparation of the tubesheet. Specifically, these obstructions can occur from smearing and distortion of the fiber wall and epoxy matrix during the final skiving machining process of the tubesheet to open the fiber bores. Therefore, the filler should not adversely effect the machining of the tubesheet.

The present invention solves the problem of providing a light weight, high strength tubesheet which is easily machined and achieves maximum fluid flow through the opening of the fiber bores, without losing the desirable features of prior art tubesheets.

SUMMARY OF THE INVENTION

This invention involves hollow fiber membrane permeators containing tubesheets which have high strength, light weight, are easy to machine, and yield fiber bores with a high degree of openness. In particular, this invention consists of producing tubesheets which comprise a tubesheet potting material with a high viscosity incorporating a microsphere filler which are nominally spherical with a nodular or nonsmooth surface. The microspheres are preferably hollow and nonporous and are added at about 1-100% by weight based on the weight of the potting material. The microspheres have a particle size of 5-200 microns and a density which is less than that of the potting material. The addition of microsphere filler to the tubesheet yields other benefits including improved permeator performance, reduced epoxy costs, and lower manufacturing costs.

SUMMARY OF FIGURES

FIGS. 1, 2 and 3 are charts which show the shear strength for a tubesheet incorporating various microsphere fillers as a function of their weight percent in the epoxy matrix of the tubesheet.

FIG. 4 is a chart which shows the percentage change in shear strength of a tubesheet incorporating SF-14 EXTENDOSPHERE microsphere filler treated with various surfactants and surface modifiers.

DETAILED DESCRIPTION OF THE INVENTION

The present invention involves mixing nominally spherical, nonsmooth fillers with the epoxy matrix having a viscosity of about 30,000–40,000 cp at 25° C. used to form a tubesheet in a hollow fiber membrane permeator. The filler is added to the tubesheet potting material prior to solidifying. The precise size, configuration and composition of the microsphere filler is not critical so long as the filler achieves the objectives of either increasing the shear strength and machinability of the tubesheet and reducing the weight of the tubesheet. Preferably, the filler has a density of about 0.70–0.80 grams per cubic centimeter. It is important that the specific gravity of the filler is less than that of the potting material for the tubesheet. The microspheres are preferably from about 5 to 200 microns in diameter, most preferably about 50–70 microns in diameter. The average particle size is preferably 30–100 microns. The microspheres may comprise about 1% to about 10% by weight of the epoxy matrix (potting material plus filler), preferably about 4–8%. The microspheres are nodular or nonsmooth and are preferably nonporous and may also be hollow. The microspheres may be fabricated from any suitable material, preferably ceramic, glass, perlite, silica, phenol or lightweight burned aggregate. The integrity of the filler must not be compromised when the epoxy is cured at elevated temperatures.

Fillers that are suitable for reducing weight and enhancing performance properties of plastics are known as hollow microspheres and are commercially available from the PQ Corporation, 11 Executive Mall, P.O. Box 840, Valley Forge, Penn. 19482. Such fillers are also useful for extending the volume of basic materials and reducing weight for such uses as thermoset, compression molded plastics, lightweight concretes, resin matrices, foundry materials, adhesives, explosives and protective coatings. In this family of microspheres, consisting of nominally spherical particles encapsulating low pressure gas, there are basically two products: Q-CELS and EXTENDOSPHERES. The shell material of the Q-CEL products is a sodium borosilicate glass and the material of the EXTENDOSPHERES is a silica, alumina, iron oxide ceramic. Table 1 describes the physical properties of four commercially available microsphere fillers. Through experimentation, it has been found that EXTENDOSPHERES are suitable for use with the present invention.

TABLE 1

| | Comparison of Typical Properties For Particulate Fillers[1] | | | |
|---|---|---|---|---|
| | EXTENDOSPHERES | | Q-CEL | |
| | SF-12 | SF-14 | 2116 | 600 |
| Physical Form | Hollow, ceramic nonporous microspheres | Hollow, ceramic nonporous microspheres | Hollow, glass microspheres | Hollow, glass microspheres |
| Surface Nature | Rough, Nodular, Textured | Rough, Nodular, Textured | Smooth | Smooth |
| Color | Gray | Gray | White | White |
| Specific Gravity[2] (g/cc) | 0.70–0.80 | 0.70–0.80 | 0.13–0.15 | .41–.45 |
| Particle Size[3] Range (microns) | 10–125 | 10–100 | 10–180 | 10–160 |
| Average Particle[3] Diameter (microns) | 65 | 57 | 72 | 62 |
| Compressing Strength (psi) | 4000 | 4000 | 250 | 2300 |

[1]all manufactured by PQ Corporation
[2]reference ASTM D-2840 (Average True Particle Density of Hollow Microspheres)
[3]sieve analysis FIGS. 1, 2 and 3 show the expected percent change in strength for tubesheets which would incorporate various microsphere fillers as compared to tubesheets with no microsphere fillers. Typically, such a tubesheet would comprise a filled epoxy matrix that encapsulates the ends of about 400,000 anisotropic hollow-fiber membranes comprised of polyimide and having an exterior skin, an outside diameter of about 240 microns, and an inside diameter of about 170 microns. A preferred permeator bundle utilizing the invention would consist of a parallel array of fibers potted at one or both ends with a potting material having a viscosity of about 30,000–40,000 centipoises containing a hollow microsphere filler with a nodular surface making up about 5% of the matrix by weight. The bundle would preferably be about 8.8 inches in outer diameter by 26.3 inches long. After forming the bundle, the filled epoxy ends would be cured at 100° C. for about 4 hours and then machined and finally skived to open the ends of the fibers to permit communication between the two tubesheet ends of the permeator.

To gather data on the strength of a tubesheet, test samples were made that simulated a tubesheet, as follows: A cylindrical cup about 2 inches in diameter and 4 inches tall was filled with a hank of several thousand fibers placed along the axis of the cup to a packing density of about 45–50%. The fibers were of the type described above, but were scrap hanks that did not pass porosity and permeability test for actual use in a permeator. The potting material and filler were blended together to form the epoxy matrix and poured into the cup, and vibrated as necessary to get good filming and wetting with the fibers, to a level of about 3 inches. The matrix was allowed to cure and the cup was cut perpendicular to the axis of the cup to provide several discs from which rectangular samples were cut across the disc diameter for strength measurments. The samples were grasped by clamps and pulled in a direction perpendicular to the fiber axis to gather shear strength data per method ASTM D-732. The strength data point plotted in the Figures represents the average of about three to four samples from a cup.

It is apparent that the specific gravity of the tubesheet incorporating the microsphere filler is less than the specific gravity of conventional tubesheets, because the specific gravity of filler is less than that of the epoxy matrix.

For the tests, the epoxy matrix comprised an epoxy resin and curing agent. Varying amounts of microsphere filler ranging from about 1% to 25% by weight of the matrix are mixed into the potting material. This mixture is then combined with a quantity of curing agent based on a 75/25 ratio by weight of the resin (Hardman Epocap H-17520A) and curing agent (Hardman Epocap H-17451B). The filled matrix is then combined with the fiber hank in the sample cup and allowed to cure. After the chemical curing reaction has peaked, the cup is placed in an oven for 4 hours at 100° C. Samples are then obtained from the cup.

FIG. 1 demonstrates that tubesheets prepared, as described above, with SF-14 EXTENDOSPHERES show surprisingly increased strength over tubesheets with no microsphere filler. For example, when the SF-14 EXTENDOSPHERES are incorporated into the potting material at a level of 5% of the weight of the epoxy matrix, the epoxy matrix has an approximate 7% weight reduction and an increase in shear strength of 35% over an epoxy matrix with no filler. The shear strength increase for SF-14 EXTENDOSPHERES at a level of 5% of the weight of the epoxy matrix was equivalent to what can be achieved with a conventional talc filler at a level of 25% by weight which results in a heavier tubesheet by about 20%. Although the talc increases the shear strength of the tubesheet, it undesirably increases the weight of the tubesheet because the specific gravity of the talc is greater than that of the potting material. The present invention achieves both reduced weight and increased strength, along with other advantages that are described herein, with the same filler material.

FIGS. 2 and 3 are charts which show the percentage change in shear strength for tubesheets which incorporate Q-CEL 2116 and Q-CEL 600. The addition of Q-CEL 2116 reduces the weight of the tubesheet and increases the shear strength of the tubesheet up to about 12% filler by weight in the epoxy matrix. After a level of 12%, the shear strength is reduced below the shear strength of a tubesheet without any filler. FIG. 3 is a chart which shows the percentage change in shear strength and density for tubesheets which incorporate Q-CEL 600. It is believed that the Q-CELS do not achieve significant improvement in shear strength of the tubesheet as a result of their smooth surface. The EXTENDOSPHERES, on the other hand, have a nodular or nonsmooth surface which is believed to enhance shear strength.

The microsphere filler is relatively fragile and may be pulverized or broken. Subsequent quantities of the filler are not pulverized or broken when mixed with the potting material. The pulverized or broken microspheres, like the talc, have a density which is higher than that of the tubesheet, thereby increasing the overall density of the tubesheet. It is therefore apparent that different results may be obtained depending on how much of the microsphere filler is pulverized or broken; which depends in part on the type of filler and the method for mixing the filler with the potting material. In order to achieve maximum reduction in the weight of the tubesheet, it is desirable to mix the filler with the potting material in a manner that breaks the least amount of filler.

An important objective of the present invention is to achieve weight reduction without a material adverse effect on the strength of the tubesheet. As noted above, it is believed that one of the properties of the microsphere filler which maximizes those objectives is a nodular or nonsmooth surface on the filler particles. The EXTENDOSPHERES are observed under a microscope to have a pitted and nodular surface compared to the smooth glassy surface of the Q-CELS; it is thought that this nodular surface results in better adhesion between the resin and filler particles and therefore a better shear strength for the tubesheet with EXTENDOSPHERES rather than Q-CELS.

The weight reduction of the tubesheet is particularly important for applications in which the weight is a concern. For example, gas permeators may be used on board helicopters and aircraft, especially combat aircraft, where low weight is critical to high performance operation. The filler has a lower specific gravity than the preferred potting materials for the tubesheet; therefore, incorporating the filler into the matrix of the tubesheet reduces the overall weight of the tubesheet. The filler has the added surprising advantage of increasing the shear strength of the tubesheet. The increased strength of the tubesheet enables the permeator to be designed with a narrower tubesheet. In particular, a narrower tubesheet incorporating the filler will be strong enough to withstand large shear stresses encountered when fluid pressure is applied to the tubesheet during operation of the permeator. As such, the increased strength of the tubesheet may ultimately allow further reduction in the overall weight of the tubesheet.

Other important advantages are also attained, particularly improved ease of machineability during the final skiving operation to open the fiber bores. The improved machinability is especially critical in light of the use of potting materials which tend to compound damage to the fragile hollow fibers during the skiving operation. In particular, a significantly higher number of round, fully open and undistorted fiber bores are observed with the tubesheet containing microsphere filler over the tubesheet containing talc. These benefits translate to other advantages including improved permeator performance from more open fibers, and lower manufacturing costs from faster machining speeds, less skiving rework, less blade drag during skiving, and the preclusion of very expensive hardened cutting blades.

Another advantage of incorporating the filler into the tubesheet is a reduction in the exothermic temperature of the epoxy. For example, the peak exothermic temperature for the epoxy matrix described in the examples is 212° C. When the filler is incorporated into the matrix of the tubesheet, it is observed that the epoxy has a peak exotherm temperature of 145° C. Further, incorporation of the filler does not develop leak paths in the tubesheet because of poor blending or incomplete coating of the hollow fiber.

The ratio of filler to epoxy matrix may be adjusted to achieve the desired weight reduction at a given increased strength. The properties of the microsphere filler may also be improved significantly by surface modifiers that increase the strength for a given ratio and weight reduction. Therefore, if more filler is added along with the surface modifier, a greater weight reduction is possible with no sacrifice in strength.

Suitable surface modifiers include surfactants such as TYZOR TPT, TYZOR LA, MPD-6765, ZONYL FSN, ZONYL FSO, FC-430, and FC-431. It is also possible to treat the microsphere fillers with a crosslinking reactive agent such as titanium, silane or chromium based compounds. The SF-14 EXTENDOSPHERES are treated with the surface modifiers for 30 minutes, then dried at 35° C. under 20 inches Hg vacuum for 30 minutes prior to blending with the epoxy resin. FIG. 4 is a chart which shows the change in shear strength for an epoxy matrix which incorporates 4.53% by weight SF-14 EXTENDOSPHERES treated with various surface modifiers. The percent surface modifier is based on the weight of the matrix. FIG. 4 demonstrates that the application of a surface modifier to the microsphere filler further increases the shear strength of the tubesheet. This improvement is achieved without a significant increase in the weight of the tubesheet.

For example, FC-430 modifier increases strength of the tubesheet with SF-14 EXTENDOSPHERE matrix (at 4.53% by weight of the epoxy matrix) by 10%. With MPD-6765 a strength improvement of up to 50% is achieved. With TYZOR TPT a strength improvement of up to 35% is achieved.

Under certain circumstances, it may be beneficial to add a small amount of filler to a polymer tubesheet in a ratio sufficient only to increase the strength with minimal decrease in the weight, or to add a larger amount of filler to a polymer tubesheet in a ratio to only reduce the weight without increasing the strength. There are lower and upper limits of the invention that accomplish this both with and without the use of surface modifying agents.

The configuration of the permeator and the tubesheet contained therein are well-known. The cross-sectional configuration (i.e., the configurations lying in a plane perpendicular to the longitudinal orientation of the hollow fiber membranes) of tubesheets is usually generally circular. It is also apparent that the cross-sectional configuration may be in any other form such as triangular, trilobal, square, rectangular, trapezoidal, pentagonal, hexagonal, free form, or the like. The maximum cross-sectional dimension of the tubesheet may also vary substantially. For instance, the maximum cross-sectional dimension of the tubesheet may be as little as 0.5 centimeter for laboratory-scale experimentation to 1 meter or more for treating large volume fluid streams. The face of the tubesheet may be any suitable configuration and is generally substantially the same configuration as the cross-sectional configuration of the tubesheet. The face may be substantially flat or may be curved or irregular in surface contour. The tubesheet may contain one or more bundles of hollow fiber membranes.

The hollow fiber membranes may be of any convenient configuration, e.g., circular, hexagonal, trilobal, or the like in cross-section and may have ridges, grooves, or the like extending inwardly or outwardly from the walls of the hollow fiber membranes. Generally, the maximum outside cross-sectional dimension of the hollow fiber membranes is at least about 10 microns and often is up to about 1000 or more microns. In many instances, it is preferred that the maximum interior dimension (maximum bore dimension) of the hollow fiber membranes be at least about 30 to about 500 microns. The ratio of the wall thickness to maximum outside dimension of the hollow fiber membranes is frequently about 0.05 to 0.50, preferably, about 0.2 to 0.4. The hollow fiber membranes may be isotropic, i.e., having substantially the same structure throughout the thickness of the wall, or anisotropic, i.e., having one or more regions within the thickness of the wall having a more dense structure. The hollow fiber membranes are useful in fluid separations, i.e., they may serve as the support for coating which provides selective separation or as the medium which affects the separation.

Advantageously, this invention enables a wide range of materials to be employed for the fabrication of the hollow fiber membranes. Preferably, the materials used to fabricate the hollow fiber membranes are elastic and do not smear when the tubesheet is machined or the bores of the hollow fibers are severed with, for example, a knife. Smearing of the hollow fiber membrane may disadvantageously cause the membrane to distort or close, ultimately decreasing the performance of the permeator. The material for the hollow fiber membranes may be synthetic or natural and may be inorganic, organic or organic mixed with inorganic. Typical inorganic materials for the hollow fiber membranes may be glasses, ceramics, cermets, metals, and the like. The organic materials are generally polymeric in nature. Typical polymers suitable for the hollow fiber membranes can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate; cellulose propionate, ethyl cellulose, methyl cellulose, nitrocellulose, etc.; polyamides and polyimides, including aryl polyamides and aryl polyimides; polyethers; poly(arylene oxides) such as poly(pheynylene oxide) and poly(xylylene oxide); poly(esteramide-diisocyanate); polyurethanes; polyesters (including polyarylates) such as poly(ethylene terephthalate), poly(alkyl methacrylates), poly(alkyl acrylates), poly(phenylene terephthalate), etc.; polysulfides; poly(siloxanes); polymers from monomers having the alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl phosphates), and poly(vinyl sulfates), polyallyls; poly(benzobenzimidazole); polyhydrazides; polyoxadiazones; polytriazoles; poly(benzimidazole); polycarbodiimides; polyphosphazines, etc. and interpolymers, including block interpolymers containing repeating units from the above and grafts and blends containing any of the foregoing. Typical substituents providing substituted polymers include halogens such as fluoride, chloride and bromine; hydroxy groups, lower alkyl groups; lower alkoxy groups, monocyclic aryl; lower acyl groups and the like. The polymer may contain modifiers, plasticizers, fillers, etc.

The potting material to form the tubesheet may be comprised of any suitable material having a viscosity of about 30,000–40,000 cp. The viscosity of the potting material with the microsphere filler is preferably about 55,000–85,000 cp. Preferably the potting material can be in an essentially liquid form when preparing the tubesheet and can thereafter be solidified, e.g., by cooling, curing, or the like. The solidified potting material should exhibit sufficient structural strength for providing a tubesheet and be relatively inert to moieties to which it will be exposed during fluid separation operation.

The potting material may be organic, inorganic or organic containing inorganic material, and the potting material may be natural or synethetic, Typical inorganic materials include glasses, ceramics, cermets, metals, and the like. Conveniently, the potting material comprises a solidifiable resin. Typical resins include phenolaldehyde resins, melamine-aldehyde resins, thermosetting artificial rubbers, acrylic resins, urethane resins, silicone resins, polysulfides, acetals, cellulosics, fluorocarbons, vinyls, styrenes, polyethylene, polypropylene, and other olefinically-unsaturated monomers, and the like. Particularly attractive potting materials are the epoxy resins, e.g., from polyglycyl resins preferably containing one or more diglycidyl ethers derived from resorcinol, catechol, hydroquinone, phlorogluicine, 4,4'-dihydroxybenzophenone, 1,1-bis(4-hydroxyphenyl) ethane, 2,2-bis(4-hydroxyphenyl) propane (Bisphenol A), bis(2-hydroxynaphthyl) methane, 2,2-bis(4-hydroxyphenyl) butane, 4,4'-dihydroxyphenyl phenyl sulfone, ethylene glycol, propylene glycol, butanediol, pentanediol, isopentanediol, in oleic dimer acid, poly(oxypropylene) glycol, 2,4,4'-trihydroxybisphenyl, 2,2'-4,4'-tetrahydroxybisphenyl, Bis-resorcinol F, 2,2'-4,4'-tetrahydroxybenzophenone, 1,1-bis(hydroxyphenyl) cyclohexane, bisphenol-hexafluoroacetone, aniline, paraaminophenol, isocyanurate, cyanuiric chloride, hydantoin, tetraphenylene ethene, phenol-formaldehyde novolac, o-creson-formaldehyde novolac, cycloaliphatic epoxy resins, and the like. These resins may be substituted, e.g., with hydroxyl or halogen moieties, e.g., fluoride, chlorine and bromine (such as tetrabrominated bisphenol A).

Commonly, the epoxy is cured with a curing agent. Curing agents are well known in the art. The potting material may contain other components such as plastisizers, bond promoting agents, cure accelerators, thickening agents, dyes and pigments.

EXAMPLES

The following examples are provided as illustrations of several embodiments of the methods of this invention. All parts and percentages of solids and liquids are by weight unless otherwise indicated.

Five 8-9 inch diameter permeator bundles were made using bundles of about 400,000 anistropic hollow-fiber membranes comprised of polyimide and having an exterior skin, an outside diameter of about 240 microns, and an inside diameter of about 170 microns. The bundles consisted of a parallel array of the fibers potted at both ends with an epoxy matrix (Hardman H 17520-A resin and H 17451-B curing agent). Three of the permeator bundles were made with a 21.3% talc filler (by weight of the matrix) blended with the matrix for the tubesheet at one end, and a 4.5% SF-14 hollow ceramic microspheres filler (by weight of the matrix) blended with the matrix for the tubesheet at the other end. A fourth permeator bundle had the 21.3% talc filler blended with the matrix for the tubesheets at both ends, and a fifth permeator bundle had the 4.5% SF-14 hollow ceramic microsphere filler blended with the matrix for the tubesheets at both ends. All of the bundles were machined and skived to evaluate the machinability of the tubesheets. All tubesheets with the SF-14 filler could be machined at faster speeds with deeper cuts and faster tool feed rates than the talc-filled tubesheets, thereby improving the manufacturing rate for the permeators. In addition, all tubesheets with the SF-14 filler could be skived with a deeper cut without smearing, and the tube ends were observed to be more open and less deformed than the talc-filled tubesheets, thereby facilitating more uniform, unrestricted flow of the permeate fluid.

It will be understood that the specifications and examples are illustrative but not limiting of the present invention and that other embodiments within the spirit and scope of the invention will suggest themselves to those skilled in the art.

What is claimed is:

1. A tubesheet for a hollow fiber membrane permeator having a plurality of hollow fiber membranes suitable for fluid separations embedded therein comprising a cured, solidified epoxy matrix, said matrix comprising (a) potting material with a viscosity of 30,000–40,000 centipoises at 25° C., and (b) a nominally spherical filler in which the filler:
   (i) has a particle size range of about 5 to 200 microns;
   (ii) is added to the potting material at about 1–20% by weight based upon the weight of the epoxy matrix;
   (iii) has a nonsmooth surface;
   (iv) has a density which is less than that of the potting material; and
   (v) is pretreated with a surface modifier agent.

2. A tubesheet according to claim 1 wherein the filler is a ceramic comprised of at least one member selected from the group consisting of silica, alumina or iron oxide.

3. A tubesheet according to claim 1 wherein the surface modifier agent is anionic, nonionic, amphoteric, cationic, or free radical forming in nature.

4. A tubesheet of claim 1 wherein the solidifiable polymer is made from a polymerizable monomer.

5. A tubesheet of claim 1 wherein the polymerizable monomer is an epoxy.

6. A tubesheet of claim 1 wherein the nominally spherical filler has a nodular surface.

7. A tubesheet of claim 1 wherein the nominally spherical filler has an average particle size of about 30 to 100 microns.

8. A process for making a tubesheet for a hollow-fiber membrane permeator having a plurality of hollow fiber membranes suitable for fluid separations embedded therein comprising (a) mixing a solidifiable polymer potting material with a nominally spherical filler to form an epoxy matrix in which the filler:
   i) has a particle size range of about 5 to 200 microns;
   ii) is added to the potting material at about 1–20% by weight based upon the weight of the epoxy matrix;
   iii) has a nonsmooth surface;
   iv) has a density which is less than that of the potting material; and
   v) is pretreated with a surface modifier agent; and (b) applying the mixture to the hollow-fiber membranes.

* * * * *